UNITED STATES PATENT OFFICE.

DAVID FERGUSSON, OF BUFFALO, NEW YORK, ASSIGNOR TO THE PIERCE ARROW MOTOR CAR COMPANY, OF BUFFALO, NEW YORK.

CHANGE-SPEED-GEAR TRANSMISSION.

1,396,512.　　　　　Specification of Letters Patent.　　Patented Nov. 8, 1921.

Application filed March 8, 1919. Serial No. 281,327.

*To all whom it may concern:*

Be it known that I, DAVID FERGUSSON, a citizen of the United States, residing at Buffalo, in the county of Erie and State of New York, have invented a new and useful Improvement in Change-Speed-Gear Transmission, of which the following is a specification.

This invention relates to change speed gears or gear transmissions of the kind that are employed in motor vehicles for changing the speed and reversing the motion of the vehicle, and more particularly the invention relates to gear transmissions of the well known clash or sliding type, in which one or more gears of the transmission are shifted into and out of mesh with coöperating gears for effecting the change in speed, or direction of rotation of the driven shaft or member. It is well known that in the use of transmissions of this type the change from one speed to another or from one direction of rotation to another of the driven member is accompanied by an objectionable noise or undue strain on or injury to the mechanism unless the change is effected at certain more or less well defined critical speeds of the driving and driven members, and many users of motor vehicles find great difficulty in accomplishing the noiseless and proper operation of the transmission. This objectionable noise and strain on the mechanism incident to the change of speed and direction of motion of the driven part are avoided in another type of transmission gear in which the gears remain always in mesh and the change is effected by coupling or connecting one or another loose gears of the transmission to a driven shaft or member by means of some sort of a key or clutch device. This constant mesh type of transmission is, however, objectionable because it is noisy in operation on account of having a number of inter-meshing gears which are always in motion when the transmission is in operation.

One object of the invention is to produce a change speed gear or gear transmission mechanism of the clash or sliding gear type which has the recognized advantages of this type of transmission, but which enables the speed or direction of rotation of the driven part to be changed easily and noiselessly without undue strain on the mechanism, and without the necessity of first speeding up or slowing down the driving or driven members substantially to critical speeds as is necessary in clash or sliding gear transmissions as heretofore constructed.

Another object of the invention is to improve the construction of change speed gear transmissions as hereinafter described and claimed so as to enable the attainment of certain stated desirable results in the use of the transmissions.

Figure 1:
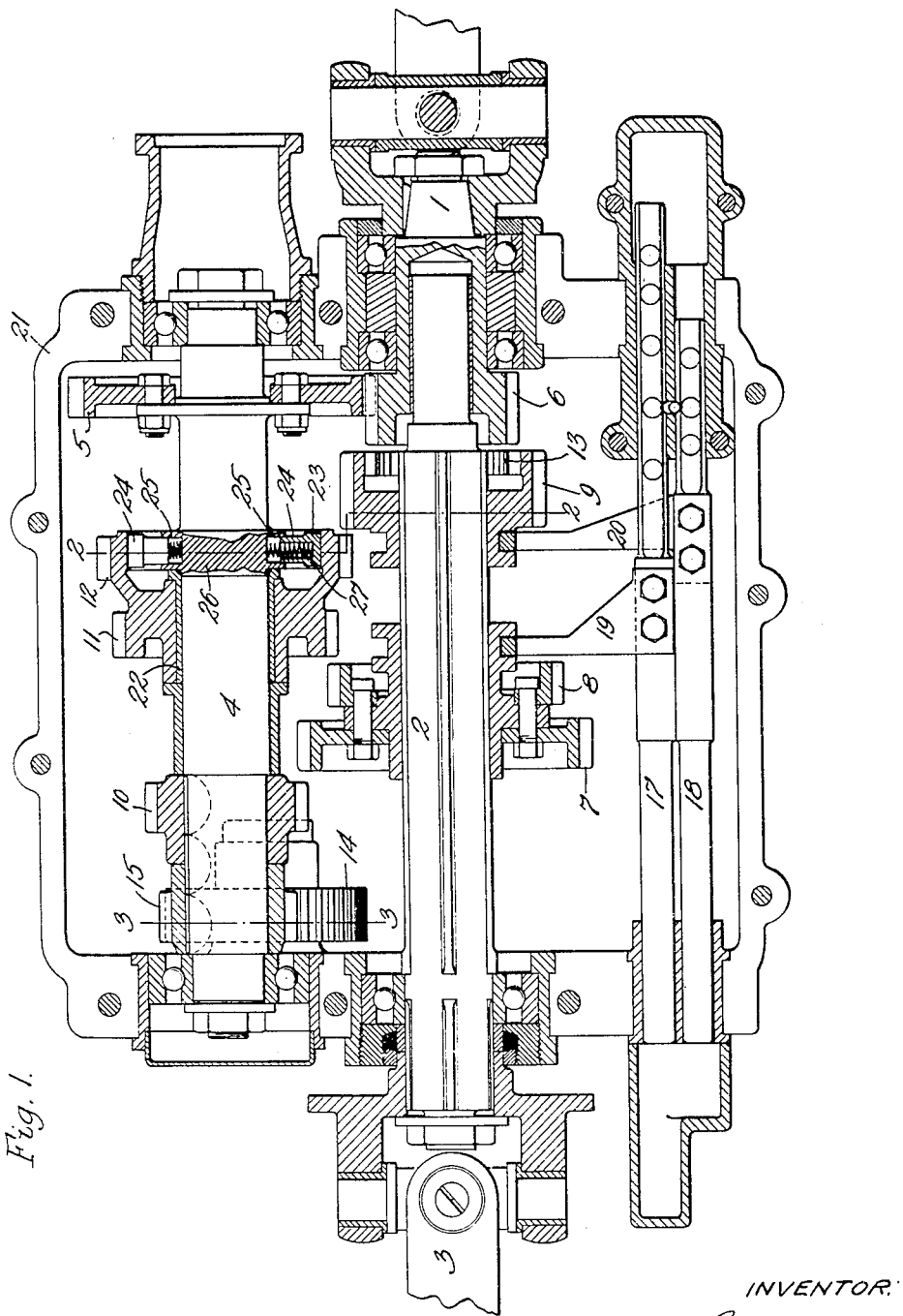

In the accompanying drawings:

Figure 1 is a sectional plan view of a change speed gear or transmission embodying the invention.

Figure 2:
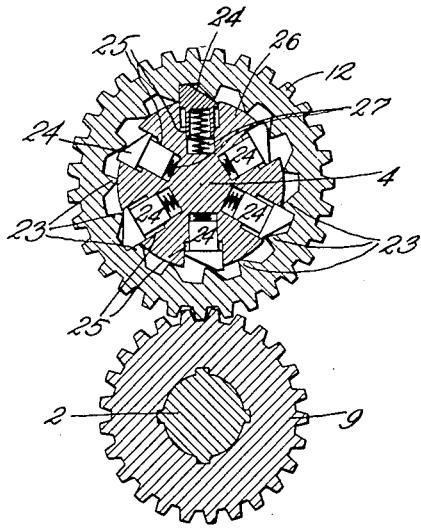
Figure 3:
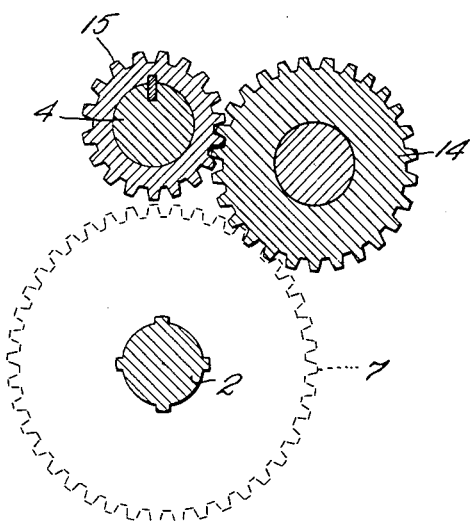

Figs. 2 and 3 are sectional elevations thereof on lines 2—2 and 3—3, respectively, Fig. 1.

1 represents a driving shaft or member which receives its motion from an engine or other source of power. As ordinarily used in motor vehicles, the vehicle clutch is interposed between this driving shaft and the vehicle engine or motor for connecting the driving shaft with and disconnecting it from the engine. 2 represents a main or driven shaft or member, which, as usual, is arranged in axial alinement with the driving shaft and transmits motion to the rear ground wheels of the vehicle through the usual universal joint 3 and power shaft or other suitable mechanism. 4 represents a countershaft or intermediate motion transmitting member which is arranged parallel with the other shafts and is driven by a gear 5 thereon meshing with a gear 6 on the driving shaft. This countershaft rotates when the driving shaft is in motion. One or more gear wheels are splined or otherwise secured on the driven shaft 2 so as to turn therewith but permit the gears to be shifted or slid axially on the shaft for moving them into and out of mesh with coöperating gears on the countershaft. The transmission shown in the drawings is adapted to give four different forward speeds and one reverse speed, and three shiftable gears 7, 8 and 9 are provided on the driven shaft 2. The two gears 7 and 8 are bolted together or otherwise formed or connected to turn and shift together, and the other gear, 9, is adapted to shift on the driven shaft 2 independe tly of the connected gears 7 and 8. 10, 11 and 12 represent gear wheels on the countershaft with which the gears 7, 8 and 9 are respectively adapted to mesh. The connected gears 7 and 8 are moved to the left to place the gear 7 in mesh with the gear 10 to give the first or slowest forward speed, and are moved to the right to place the gear 8 in mesh with the gear 11, to give the second forward speed. The gear 9 is moved to the left to place it in mesh with the remaining gear 12 on the countershaft to obtain the third speed. The direct drive or high speed is obtained by shifting the gear 9 to the right to move teeth or clutch members 13 thereon into engagement with the teeth or coöperating clutch members on the wheel 6 on the driving shaft 1. To reverse the motion of the driven shaft 2, the gear 7 thereon is moved to the left beyond the gear 10 into mesh with a suitably mounted idler or reversing gear 14 which in turn meshes with a gear 15 on the countershaft. The gears 7, 8 and 9 can be shifted by any suitable means, such as the usual sliding shift rods 17 and 18, one connected by a forked arm 19 to the connected gears 7 and 8 and the other connected by a forked arm 20 to the gear 9.

The change speed gear or transmission as thus far described is of known construction and operates in a well known manner and, except as hereinafter described, it may be of any usual or suitable construction. The several shafts can be journaled or mounted in any suitable way, preferably in the usual transmission box or casing 21.

One or more of the gears on the countershaft, preferably the second and third gears 11 and 12, are not, as usual, rigidly secured to this shaft but are adapted to turn relatively to the countershaft and are adapted to be connected to or disconnected from the countershaft, so as to be turned thereby or to turn independently thereof, by a ratchet and pawl or clutch mechanism of any suitable construction. In the construction shown, the second and third speed gears 11 and 12 are formed integrally or connected together and are adapted to turn on a bushing 22 on the countershaft, and the gear 12 is provided with internal ratchet teeth 23 with which are adapted to engage a plurality of spring-actuated pawls 24 arranged to move radially in pockets 25 in a pawl carrier 26 which is rigidly secured to or formed on the countershaft. These pawls are pressed outwardly to engage the ratchet teeth of the gear 12 by springs 27 confined in the pawl pockets and entering spring cavities in the inner ends of the pawls.

This ratchet and pawl or clutch connection between the countershaft and the connected wheels 11 and 12 thereon causes the rotation of the wheels by the shaft in one direction, but permits the wheels to be turned in the same direction independently of the shaft. Therefore when one of the driven gears 8 or 9 is shifted into mesh with one of the loose counter-gears 11 or 12, if the former is turning at a greater peripheral speed than the latter, the counter-gear will be turned independently of the countershaft until its speed is reduced sufficiently for the countershaft to drive the gear 11 or 12 through the medium of the interposed ratchet and pawls, and thus drive the driven shaft 2. Since the weight and inertia of the loose counter-gears 11 and 12 are so much less than the weight and inertia of the countershaft 4 and the gears connected thereto, one of the driven gears can be thrown into mesh with one of the counter-gears without noise and strain on the transmission at any speed, even when the two gears are rotating at very greatly differing speeds. It is thus possible to shift easily and noiselessly and without danger of injury or strain to the transmission, from high speed directly into second or third speed, as may be desired, when the vehicle is traveling at a high rate of speed without first reducing the speed. This enables a driver to change to an appropriate gear in many emergencies when a change would be impossible or dangerous with the old style transmissions and eliminates the reluctance in so many drivers to change gears when they know a change in gear ratio would be proper.

In the four speed and reverse transmission shown in the drawings, both the second and third speed gears 11 and 12 are preferably made free wheels, as explained, so as to enable the quiet and safe shift to either the second or third speed as may be desired. It is obvious that others of the gears on the countershaft which mesh with the gears on the driven shaft could be free, if desired, and that either of the gears 11 or 12 alone could be free. But it is preferable to have the low speed gear 10 fast on the countershaft to enable the use of the engine for braking purposes in descending hills when the low speed gear is in action.

The transmission described operates like and has the desirable features of the usual sliding gear transmission. With it, the driver may start up on second or third speed, whichever he may select, and he may go from the direct drive to either second or third speed as he may choose, and do so silently and without danger of strain or injury to the mechanism even when running at a high rate of speed. The transmission not only runs silently when using the direct drive or high speed, a recognized advantage of the clash type of transmission, but the usual clash, strain and danger incident to the shifting in this style of transmission, are eliminated.

I claim as my invention:

1. In a change speed gear transmission, the combination of a driving member, a countershaft driven thereby, a driven shaft, a gear fixed on said countershaft, a loose gear on said countershaft, means by which the countershaft turns said loose gear in one direction and which permit said gear to turn freely in the same direction independently of the countershaft, and gears which are shiftable on the driven shaft one into and out of mesh with said fixed countershaft gear and one into and out of mesh with said loose countershaft gear.

2. In a change speed gear transmission, the combination of a driving member, a countershaft driven thereby, a driven shaft, a gear fixed on said countershaft, a loose gear on said countershaft, means by which the countershaft turns said loose gear in one direction and which permit said gear to turn freely in the same direction independently of the countershaft, gears which are shiftable independently of each other on the driven shaft one into and out of mesh with said fixed countershaft gear and one into and out of mesh with said loose countershaft gear, and means for connecting said driven shaft directly to said driving member.

3. In a change speed gear transmission, the combination of a driving member, a countershaft, intermeshing gears fixed respectively to said driving member and said countershaft for driving the latter, a driven shaft, and gearing whereby said countershaft produces different motions of the driven shaft, comprising gears connected to said driven shaft and complementary gears on the countershaft arranged so that the gears on said driven shaft may be shifted into and out of mesh with the complementary gears on the countershaft and so that only one pair of said gears will be in mesh at a time, said complementary gears including a low speed forward drive gear fixed to said countershaft and at least one other gear loosely mounted on said shaft, and a clutch device by which said countershaft turns said loose gear in one direction and which permits said gear to turn freely in the same direction independently of the countershaft.

Witness my hand, this 6th day of March, 1919.

DAVID FERGUSSON.

Witnesses:
C. W. PARKER,
M. J. PITMAN.